(12) United States Patent
Wedel

(10) Patent No.: US 6,617,556 B1
(45) Date of Patent: Sep. 9, 2003

(54) METHOD AND APPARATUS FOR HEATING A SUBMARINE PIPELINE

(75) Inventor: Michael W. Wedel, Tianjin (CN)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/125,223

(22) Filed: Apr. 18, 2002

(51) Int. Cl.[7] ................................................ H05B 6/10
(52) U.S. Cl. .................... 219/629; 219/661; 219/669; 392/469; 166/248; 166/60; 138/33; 137/341
(58) Field of Search ............................ 219/628, 629, 219/630, 660, 661, 662, 669; 392/469; 166/248, 60, 61; 138/33, 38; 137/341

(56) References Cited

U.S. PATENT DOCUMENTS

| | | | |
|---|---|---|---|
| 3,617,699 A | 11/1971 | Othmer | 392/469 |
| 3,777,117 A | 12/1973 | Othmer | 392/469 |
| 3,975,617 A | 8/1976 | Othmer | 219/300 |
| 5,241,147 A | 8/1993 | Ahlen | 219/10.51 |
| 5,256,844 A | 10/1993 | Grosvik et al. | 219/10.51 |
| 5,979,506 A | * 11/1999 | Aarseth | 138/33 |
| 6,049,657 A | 4/2000 | Sumner | 392/469 |
| 6,142,707 A | * 11/2000 | Bass et al. | 166/248 |

FOREIGN PATENT DOCUMENTS

| | | | | |
|---|---|---|---|---|
| DE | 41 14 355 | * 11/1992 | | 166/376 |
| JP | 56-130551 | * 10/1981 | | 219/629 |

* cited by examiner

*Primary Examiner*—Philip H. Leung
(74) *Attorney, Agent, or Firm*—Jeffrey R. Anderson

(57) ABSTRACT

A novel system for inductively heating a fluid conduit using an electrical cable located proximate the fluid conduit. Electricity is conducted to the cable in either a powering mode, in which a powered system is electrically coupled to the cable and substantially no inductive heating of the fluid conduit is provided, or a heating mode, in which the powered system is electrically decoupled from the cable and inductive heating of the fluid conduit is provided.

16 Claims, 4 Drawing Sheets

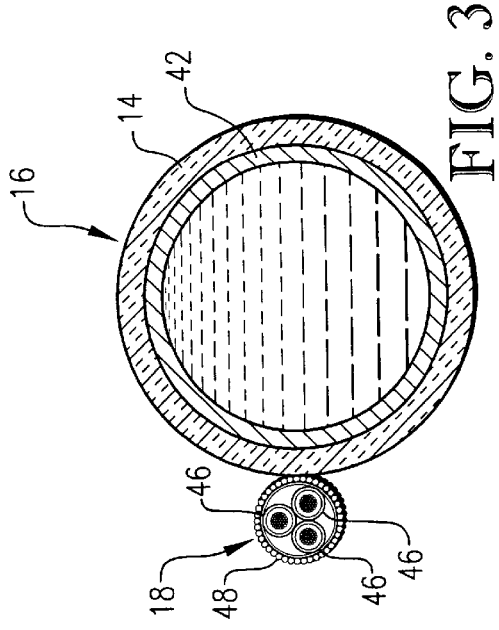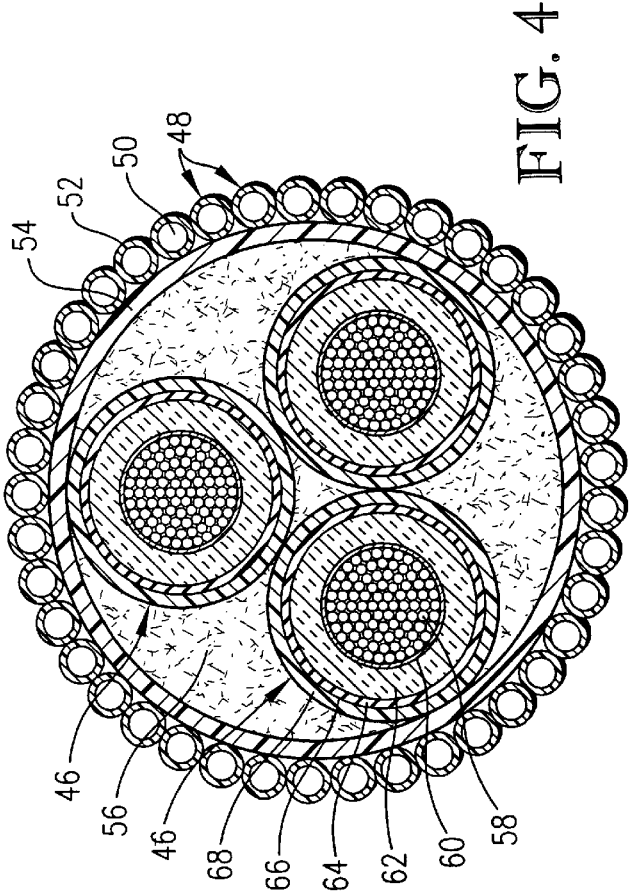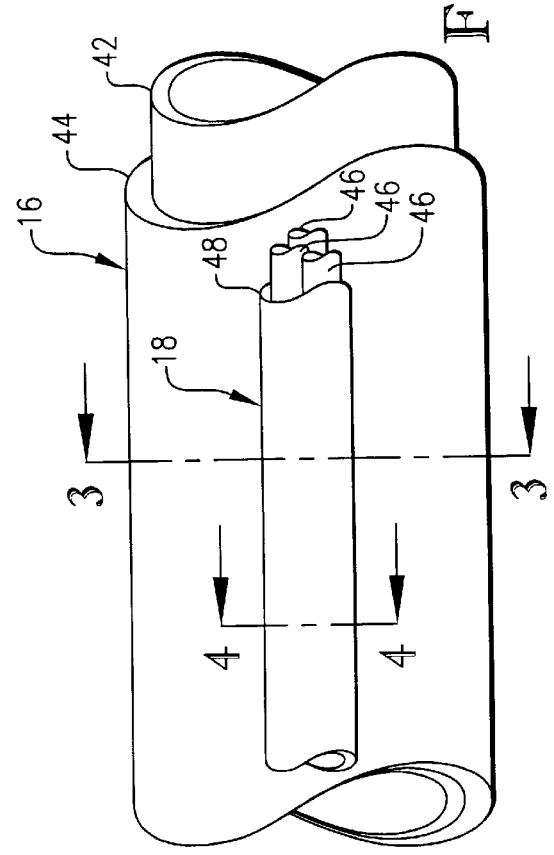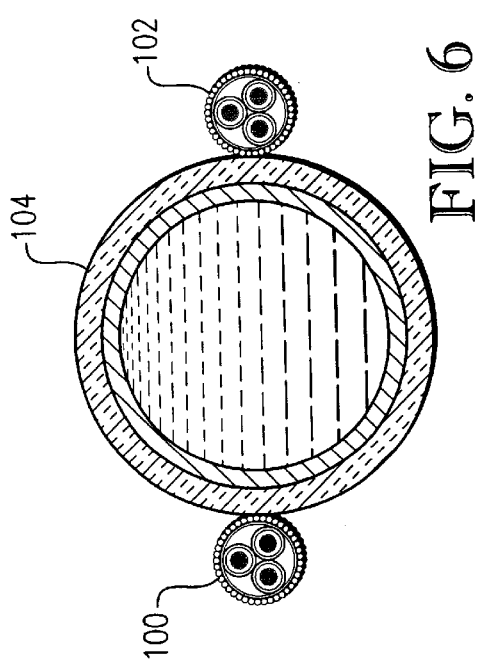

METHOD AND APPARATUS FOR HEATING A SUBMARINE PIPELINE

The present invention relates to systems for inductively heating fluid-carrying conduits. In another aspect, the invention relates to a system for inductively heating a submarine petroleum pipeline by using at least one electrical cable that can also provide power to an off-shore petroleum production platform.

BACKGROUND OF THE INVENTION

Petroleum produced from off-shore reservoirs is typically transported from one or more off-shore production facilities through submarine pipelines to a central facility for processing. Such off-shore production facilities require electrical power for operation. The central processing facility, which may be on-shore or off-shore, usually includes petroleum processing equipment and electrical power generating equipment. The electrical power generated at the central facility is commonly transmitted to the off-shore production facilities through submarine electrical cables running adjacent the submarine transportation pipeline.

When the submarine petroleum pipeline is surrounded by cool water, the unprocessed well stream (e.g., a multiphase mixture comprising oil, gas, and water) transported in the pipeline is at a risk of increasing in viscosity to a point where it cannot be pumped through the terminal end of the pipeline. For example, if the flow of the well stream is stopped, the well stream cools rapidly and increases in viscosity. If the well stream cools below a certain temperature (e.g., 20° C.), crystallization and hydrate development render the well stream too viscous to be pumped through the terminal end of the pipeline.

One method known in the art for regulating the viscosity of the well stream in the pipeline is to insulate and electrically heat the pipeline. Prior art methods of electrically heating the pipeline include the use of an in-pipeline heating cable, impedance heating wherein the steel pipeline is used as an electric resistance element, and induction heating using either skin effect current tracing, dedicated supply conductors, and/or dedicated return conductors. These prior art methods are problematic and have several limitations. For example, in-pipeline heating cables, impedance heating, and skin effect induction heating are not equipped to reliably heat longer pipelines requiring a construction utilizing numerous joints. In addition the prior art methods of electrically heating the pipeline either require equipment that is incapable of also being used for electrical power transmission or require the installation of additional submarine cables in order to function. These limitations are undesirable and result in increased installation costs of either duplicate systems for heating and power transmission or multiple submarine cables. Moreover, existing off-shore electrical power transmission systems can not be efficiently and cost-effectively converted into pipeline heating systems using prior art methods.

SUMMARY OF THE INVENTION

It is an object of the present invention to provide an inductive heating system which, when not being used for heating, can also be used to transmit conventional electrical power.

A further object of this invention is to provide an inductive heating system for a submarine pipeline which is less expensive to install than prior art pipeline heating systems.

It is yet another object of the present invention to provide an inductive heating system for a submarine pipeline which employs a conventional submarine power cable as the heat inducing element.

It is still another object of the present invention to provide an inductive heating system which can be installed and operated in conjunction with an existing submarine petroleum pipeline without placing a new submarine electrical cable along the existing pipeline.

A yet further object of the present invention is to provide an pipeline heating system which can cost-effectively be employed to heat a submarine pipeline of considerable length (i.e., requiring numerous individual pipe sections).

In accordance with one embodiment of the present invention, an apparatus comprising a power source, a powered system, an electrically conductive fluid conduit, an electrical cable positioned proximate the fluid conduit, and a switching device is provided. The cable has a first end which is electrically couplable to the power source and a second end which is electrically couplable to the powered system. The switch is operable to selectively switch electricity conducted through the cable between a heating mode, in which the fluid conduit is inductively heated without providing electricity to the powered system, and a powering mode, in which electricity is provided to the powered system via the cable without substantial inductive heating of the fluid conduit.

In accordance with a further embodiment of the further invention, an apparatus comprising a petroleum pipeline, an electrical cable positioned proximate the pipeline, a powered system electrically couplable to the cable, a first power source, a second power source, and a power source switching device is provided. The first power source is operable to provide electricity in a powering mode to the powered system via the cable. Substantially no inductive heating of the pipeline is provided by the electricity in the powering mode. The second power source is operable to provide electricity in a heating mode to the cable. The electricity in the heating mode provides inductive heating of the pipeline. The power source switching device is operable to selectively switch the apparatus between the powering mode and the heating mode.

In yet another embodiment of the present invention, an apparatus comprising a submarine petroleum pipeline, a first electrical cable, a second electrical cable, a powered system, a first power source, a second power source, and at least one electrical switching device is provided. The first and second electrical cables are positioned proximate and extend generally parallel to the pipeline. The powered system is electrically couplable to the first and second electrical cables. The first power source provides electricity to the powered system via the first and second electrical cables when the apparatus is operated in a powering mode. The second power source provides electricity to the first and second electrical cables when the apparatus is operated in a heating mode. When the apparatus is operated in the heating mode, the first and second electrical cables are electrically decoupled from the powered system. The electrical switching device is operable to selectively switch the apparatus between the powering mode and the heating mode.

In still another embodiment of the present invention, an apparatus comprising an electrically conductive fluid conduit, at least one power source, a powered system, an electrical cable, and means for selectively altering electricity is provided. The electrical cable is positioned proximate the fluid conduit and is electrically couplable to the power source and the powered system. The means for selectively altering electricity is operable to selectively alter electricity conducted to the cable between a heating mode in which the fluid conduit is inductively heated without providing electricity to the powered system and a powering mode in which electricity is provided to the powered system without substantial inductive heating of the fluid conduit.

In another embodiment of the present invention, a method of heating an electrically conductive fluid conduit is provided. The method comprises the steps of: (a) positioning an electrical cable proximate the electrically conductive fluid conduit; (b) conducting electricity in a powering mode to the cable, wherein the electricity in the powering mode provides substantially no inductive heating of the fluid conduit; and (c) conducting electricity in a heating mode to the cable, wherein the electricity in the heating mode inductively heats the fluid conduit.

In a yet further embodiment of the present invention, a method of heating a submarine pipeline using a submarine electrical cable is provided. The method comprises the steps of: (a) positioning the cable proximate the pipeline: (b) electrically coupling the cable to a first power source and a powered system; (c) conducting electricity in a powering mode from the first power source to the powered system via the cable; (d) electrically decoupling the cable from the powered system; and (e) while said cable is electrically decoupled from said powered system, conducting electricity in a heating mode to the cable to thereby inductively heat the pipeline.

In a still further embodiment of the present invention, a method of providing heat to a submarine petroleum pipeline having a power cable positioned proximate thereto, with the power cable operable to conduct electrical power from a first power supply to a powered wellhead system is provided. The method comprises the steps of: (a) providing a second power supply; and (b) providing a power source switching device operably to selectively switch the power cable between a powering mode in which the power cable is electrically coupled to the first power supply and a heating mode in which the power cable is electrically coupled to the second power supply.

It should be noted that the above-listed objects need not all be accomplished by the invention claimed herein and other aspects and advantages of the present invention will be apparent from the following detailed description of the invention, the appended claims, and the accompanying drawing figures.

BRIEF DESCRIPTION OF THE DRAWING FIGURES

FIG. 2 is a partial cut-away elevation view showing a portion of the pipeline and the cable in relation to one another.

FIG. 3 is a section taken across line 3—3 of FIG. 2 showing the position of the cable and pipeline relative to one another.

FIG. 4 is a section taken across line 4—4 of FIG. 2 showing in greater detail certain features of the cable.

FIG. 6 is a section similar to FIG. 3 showing an alternative embodiment of the present invention wherein two electrical cables are positioned proximate to and extend along the pipeline.

DETAILED DESCRIPTION OF THE INVENTION

The apparatus and process of the present invention will be described with reference to the drawings. Reference to the specific configurations of the drawings is not meant to limit the invention to the details of the drawings disclosed in conjunction herewith.

Figure 1:
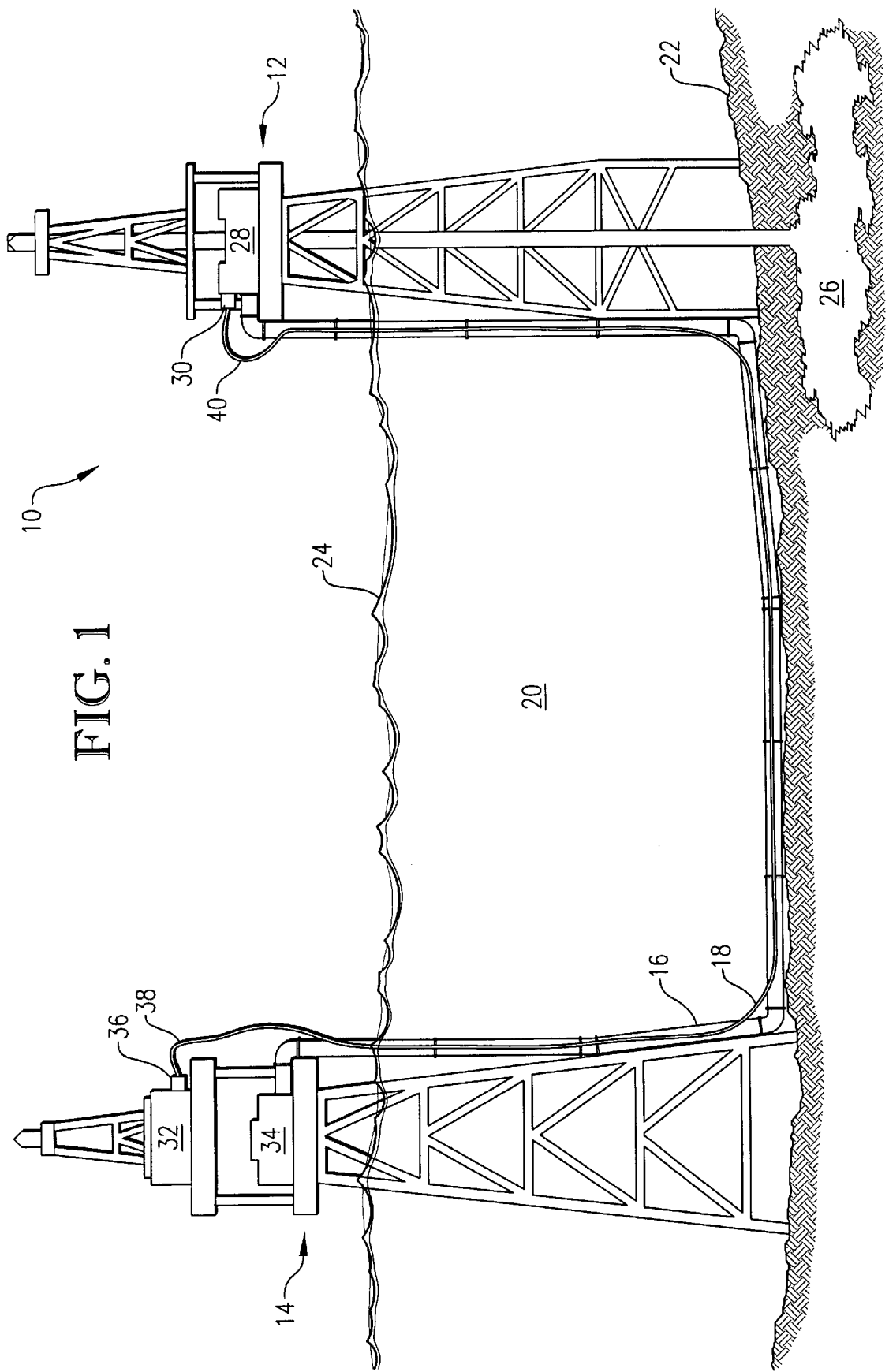
FIG. 1 is an elevation view of an off-shore petroleum production system in accordance with an embodiment of the present invention showing a wellhead platform and a central facility which are fluidically connected by a submarine pipeline and electrically connected by a submarine electrical cable.

Referring initially to FIG. 1, a simplified off-shore petroleum production, transportation, and processing system 10 is illustrated. Off-shore system 10 generally comprises a wellhead platform 12, a central facility 14, a pipeline 16, and an electrical cable 18. Wellhead platform 12 can float in a body of water 20 or can be supported on a sea floor 22 and extends at least partly above a water surface 24. Wellhead platform 12 generally includes a powered system 28 and a load switching device 30. Powered system 28 is operable to extract petroleum, along with various other fluids, from an off-shore petroleum reservoir 26 located beneath sea floor 22. Central facility 14 can be located either off-shore (as shown in FIG. 1) or on-shore. Central facility 14 typically services a plurality of off-shore production facilities, such as wellhead platform 12. Central facility generally includes a power supply 32, petroleum processing equipment 34, and a power source switching device 36. Power supply 32 is electrically coupled to a first end 38 of electrical cable 18 via power source switching device 36. A second end 40 of electrical cable 18 is electrically coupled to powered system 28 via load switching device 30.

In accordance with the present invention, power source switching device 36 and load switching device 30 cooperate to selectively switch the off-shore system 10 between a "powering mode," in which powered system 28 is powered with electricity provided by power supply 32 and conducted through electrical cable 18, and a "heating mode," in which pipeline 16 is inductively heated with electricity provided by power supply 32 and conducted through electrical cable 18. In the powering mode, second end 40 of electrical cable 18 is electrically coupled to powered system 28 and the electricity conducted through electrical cable 18 in the powering mode causes substantially no inductive heating of pipeline 16. In the heating mode, second end 40 of electrical cable 18 is electrically decoupled from powered system and the electricity conducted through the electrical cable in the heating mode causes inductive heating of pipeline 16. Although, positioning an electrical cable proximate a submarine pipeline and providing electricity in a powering mode from a central facility to a wellhead platform is common practice in the off-shore petroleum industry, it is believed that never before has the same electrical cable used for powering the wellhead platform in a powering mode been used to inductively heat the submarine pipeline in a separate heating mode. Thus, the present invention can be used to easily provide inductive heating to existing off-shore systems which already have an electrical power cable positioned proximate the pipeline.

Referring to FIGS. 2 and 3, pipeline 16 and electrical cable 18 are positioned proximate one another so that the electromagnetic field generated by the electricity conducted through electrical cable 18 in the heating mode is sufficiently strong to induce eddy currents in pipeline 16, and thereby inductively heat pipeline 16. Further, it is preferred for electrical cable 18 to extend along pipeline 16 and remain generally parallel to pipeline 16 in order to maximize the amount of eddy currents induced into pipeline 16 while minimizing the required length of electrical cable 18. Most preferably, electrical cable 18 is strapped to pipeline 16 so that the outside surface of at least a substantial portion of electrical cable 18 directly contacts the outside surface of pipeline 16.

As shown in FIGS. 2 and 3, pipeline 16 generally comprises a fluid conduit 42 and thermal insulation 44. Fluid conduit 42 can be made of any electrically conductive material capable of being inductively heated by eddy currents induced therein by an externally generated electromagnetic field. Preferably, fluid conduit 42 is made of a durable metallic material. Most preferably, fluid conduit 42 is a conventional steel pipe used to transport petroleum between an off-shore production facility and a central processing facility. Fluid conduit 42 may be at least partially covered by thermal insulation 44 to thereby prevent heat already present in or induced into fluid conduit 42 from being rapidly transferred out of the fluid conduit 42 and into the surrounding environment, typically water. Thermal insulation 44 can be any conventional thermal insulation known in the art as suitable for insulating a submarine petroleum pipeline. Preferably, thermal insulation 44 is composed of a material that provides maximum insulation effectiveness with minimum thickness. The thickness of thermal insulation 44 is preferably minimized in order to reduce the distance between electrical cable 18 and fluid conduit 42 and thereby maximize inductive heating of fluid conduit 42.

Referring now to FIGS. 2–4, electrical cable 18 generally includes a plurality of electrical conductors 46 and a protective jacket 48 surrounding conductors 46. As perhaps best illustrated in FIG. 4, protective jacket 48 can comprise a plurality of steel armor wires 50, each covered by a plastic jacket 52. Beneath protective jacket 48 is an insulation jacket 54. Electrical conductors 46 are positioned inside insulation jacket 54 and held in position relative to one another by a non-conductive filler 56. Electrical cable 18 typically comprises three individual electrical conductors 46 adapted to conduct three-phase electricity. Each electrical conductor 46 includes a plurality of conducting wires. 58 (typically copper), a layer of a semiconducting tape 60, surrounded by a layer of an electrical insulation 62, surrounded by a layer of a semiconducting extrusion 64, surrounded by a layer of an electromagnetic tape 66, surrounded by an outer layer of a plastic jacket 68. Electric cable 18 is preferably any electric cable known in the art as being capable of transmitting electricity to an off-shore petroleum production facility. Electrical cable 18 is preferably capable of transmitting high voltage three-phase electricity having a voltage greater than 2,000 volts, more preferably greater than 10,000 volts, and most preferably between 10,000 volts and 50,000 volts.

Figure 5:
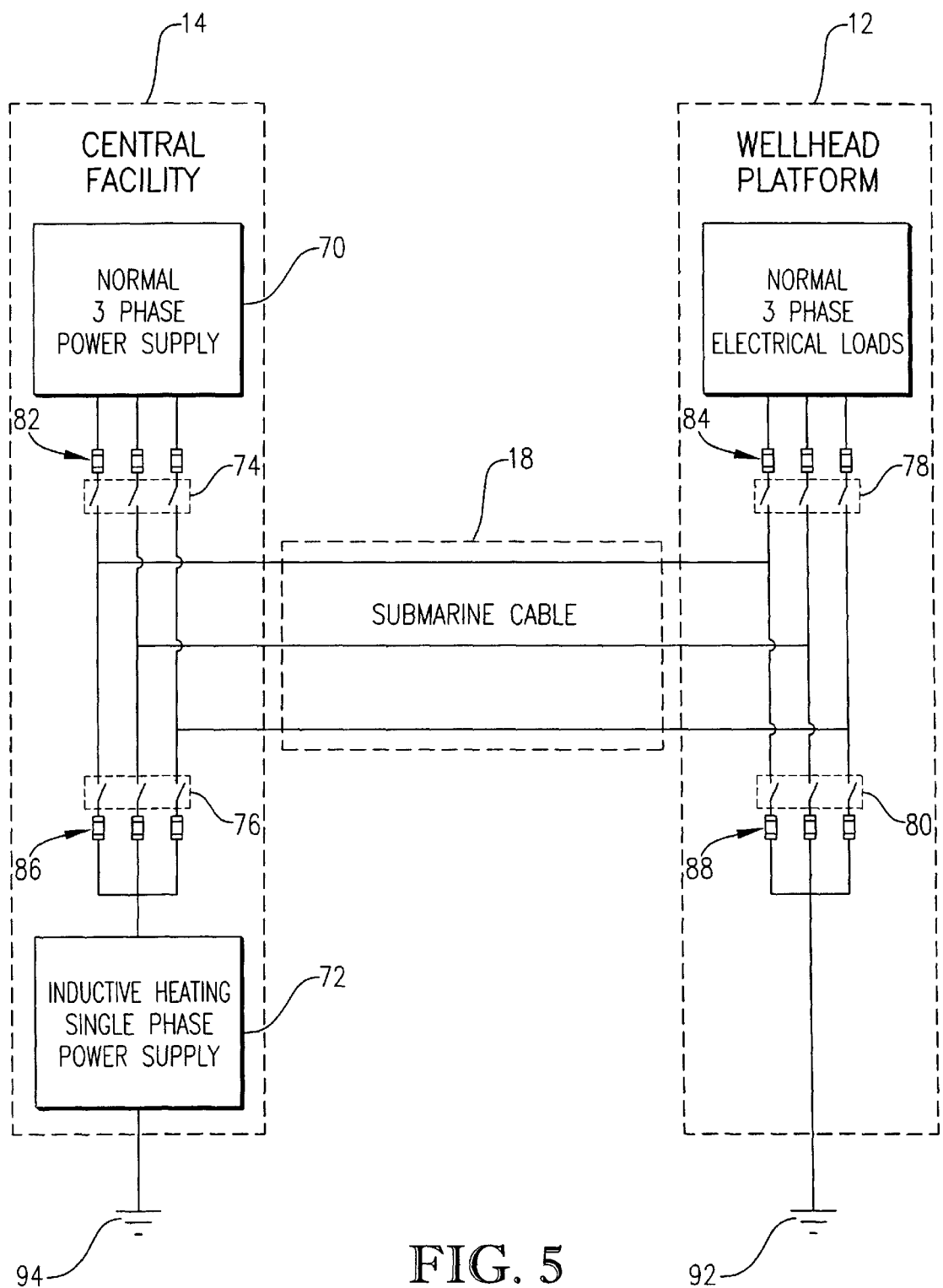
FIG. 5 is a schematic electrical diagram showing the manner in which the system is switched between a powering mode, in which a first power source provides power to a powered system via the cable, and a heating mode, in which a second power source provides inductive heating of the pipeline via the same cable.

Referring to FIGS. 1 and 5 in combination, FIG. 5 illustrates power supply 32 (shown in FIG. 1) of central facility 14 as including a first power source 70 and a second power source 72. Further, FIG. 5 illustrates power source switching device 36 (shown in FIG. 1) of central facility 14 as including a first power source switch 74 and a second power source switch 76. FIG. 5 also illustrates wellhead switching device 30 (shown in FIG. 1) of wellhead platform 12 as including a first wellhead switch 78 and a second wellhead switch 80.

Referring to FIG. 5, in the powering mode, first power source switch 74 and first wellhead switch 78 are closed, while second power source switch 76 and second wellhead switch 80 are opened. This configuration allows electricity in a powering mode to be conducted from first power source 70, through fuses 82, through electrical cable 18, through fuses 84, and to powered system 28, thereby powering powered system 28.

In the heating mode, first power source switch 74 and first load switch 78 are opened, while second power source switch 76 and second load switch 80 are closed. This configuration allows electricity in a heating mode to be conducted from second power source 72, through fuses 86, through electrical cable 18, through fuses 88, and to a wellhead platform ground 92, thereby inductively heating pipeline 16 (shown in FIG. 1). Second power source 72 is connected to a central facility ground 94 so that the electrical circuit created in the heating mode is completed by grounding second power source 72 and electrical cable 18 to a common ground.

The electrical power provided to electrical cable 18 and powered system 28 from first power source 70 in the powering mode is preferably in a three-phase form and is operable to power conventional petroleum production equipment typically found on an off-shore wellhead platform. Preferably, the electricity provided by first power source 70 in the powering mode has a voltage of more than about 2,000 volts, more preferably more than about 10,000 volts, and most preferably in the range of from 10,000 volts to 50,000 volts. Preferably, the electricity in the powering mode has a frequency in the range of from about 20 hertz to about 200 hertz, most preferably from 40 hertz to 80 hertz. Preferably, the electricity in the powering mode has a current in the range of from about 100 amps to about 800 amps, most preferably from 200 amps to 500 amps.

The electrical power provided to electrical cable 18 from second power source 72 in the heating mode is preferably in a single-phase alternating current form and is operable to produce an electromagnetic field capable of creating eddy currents in pipeline 16, thereby inductively heating pipeline 16. Preferably, the electricity provided by second power source 72 in the heating mode has a voltage of less than about 1,000 volts, preferably less than about 500 volts, and most preferably in the range of from 50 volts to 400 volts. The frequency of the electricity in the powering mode can vary greatly depending on numerous factors such as, for example, the amount of heating required, the size of pipeline 16, the wall thickness of pipeline 16, and the distance between electrical cable 18 and pipeline 16. Preferably, the electricity in the powering mode has a frequency of more than about 50 hertz, more preferably more than about 100 hertz, most preferably in the range of from 200 hertz to 5,000 hertz. Preferably, the electricity in the powering mode has a current in the range of from about 200 amps to about 5,000 amps, most preferably from 800 amps to 15,000 amps.

One advantage of the present invention is that it can be used to retrofit an existing off-shore to provide inductive heating to an existing submarine pipeline having an electrical cable located proximate thereto. Referring now to FIG. 5, an existing off-shore power system comprising first power source 70, electrical cable 18, and powered system 28 can be retrofitted to provide inductive heating by simply connecting second power source 72, power source switches 74 and 76, and wellhead switches 78 and 80 to the existing system in a manner shown in FIG. 5. First and second power sources 70 and 72, as well as switches 74, 76, 78, and 80, can be any conventional equipment known in the art for generating and switching electricity in the powering mode and electricity in the heating mode, described above.

Figure 7:
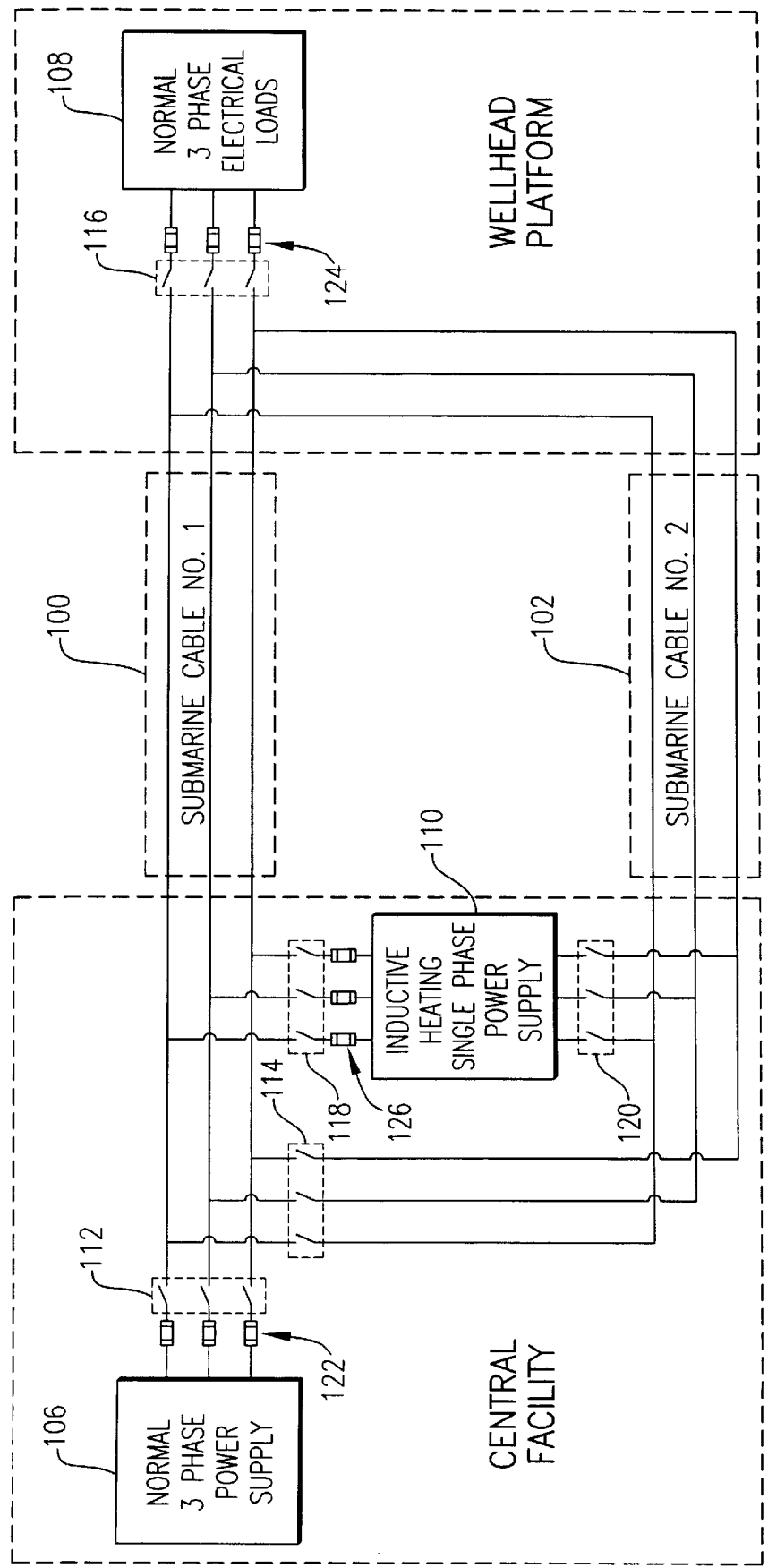
FIG. 7 is a schematic electrical diagram showing the manner in which the two-cable system of FIG. 6 is switched between a powering mode, in which a first power source provides power to a powered system via both cables, and a heating mode, in which a second power source provides inductive heating of the pipeline via both cables.

Referring now to FIGS. 6 and 7, in an alternative embodiment of the present invention, more than one electrical cable (e.g., a first cable 100 and a second cable 102) can be positioned proximate a pipeline 104. In this embodiment, electrical power from a first power source 106 in a powering mode is provided to a powered system 108 via cables 100 and 102. Having the electricity in the powering mode being carried by two cables 100 and 102 rather than one cable allows each of the cables 100 and 102 to be smaller than when a single cable is used because the powering electricity is shared between the two cables 100 and 102. In this embodiment, electrical power from a second power source 110 in the heating mode is conducted through cables 100 and 102, with second cable 102 acting as a return line.

In the powering mode, a first power source switch 112, a second power source switch 114, and a wellhead switch 116 are closed, while a third power source switch 118 and a fourth power source switch 120 are opened. In this configuration, three-phase powering electricity is provided to powered system 108 via first power source 106, fuses 122, fuses 124, and cables 100 and 102.

In the heating mode, third power source switch 118 and fourth power source switch 120 are closed, while first power source switch 112, second power source switch 114, and wellhead switch 116 are opened. In this configuration, single-phase alternating current heating electricity is conducted from second power source 110, through fuses 126, through first cable 100, through second cable 102, and back to second power source 110.

In this embodiment, the voltage and current of the powering electricity and the heating electricity in each of cables 100 and 102 will generally be approximately one-half of the voltage and current employed when only one cable is employed The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

That which is claimed is:

1. A hydrocarbon production system comprising:
a central facility including a three-phase power supply and a single-phase power supply;
a wellhead facility spaced from the central facility, said wellhead facility including powered equipment for producing hydrocarbons and a wellhead ground terminal electrically coupled to the ground;
an electrically conductive pipeline extending between the central facility and the wellhead facility; and
an electrical cable coupled to and extending alongside the pipeline,
said central facility including a first electrical switch for electrically coupling and decoupling the three-phase power supply and the electrical cable,
said central facility including a second electrical switch for electrically coupling and decoupling the single-phase power supply and the electrical cable,
said wellhead facility including a third electrical switch for electrically coupling and decoupling the powered equipment and the electrical cable,
said wellhead facility including a fourth electrical switch for electrically coupling and decoupling the wellhead ground terminal and the electrical cable.

2. The hydrocarbon production system according to claim 1,
said central facility including a central ground terminal electrically coupled to the ground,
said inductive heating supply being electrically coupled to the central ground terminal.

3. The hydrocarbon production system according to claim 1,
said first, second, third, and fourth electrical switches allowing the hydrocarbon production system to alternate between a powering mode of operation where the electrical cable provides power to the powered equipment and a heating mode of operation where the electrical cable provides inductive heating of the pipeline,
said first and third electrical switches being closed and said second and fourth electrical switches being opened when the hydrocarbon production system is operated in the powering mode,
said second and fourth electrical switches being closed and said first and third electrical switches being opened when the hydrocarbon production system is operated in the heating mode.

4. The hydrocarbon production system according to claim 1,
said three-phase power supply being operable to provide three-phase power of at least about 2,000 volts,
said single-phase power supply being operable to provide single-phase alternating current power of less than about 500 volts.

5. The hydrocarbon production system according to claim 1, said electrical cable including three insulated conductors surrounded by a common protective jacket.

6. A hydrocarbon production system comprising:
a central facility including a three-phase power supply and a single-phase power supply;
a wellhead facility spaced from the central facility, said well head facility including powered equipment for producing hydrocarbons;
an electrically conductive pipeline extending between the central facility and the wellhead facility;
a first electrical cable positioned alongside the pipeline; and
a second electrical cable positioned alongside the pipeline on a side of the pipeline generally opposite the side of the pipeline along which the first electrical cable is positioned,
said central facility including a first switch for electrically coupling and decoupling the three-phase power supply and the first electrical cable, said central facility including a second switch for electrically coupling and decoupling the single-phase power supply and the first electrical cable, said central facility including a third switch for electrically coupling and decoupling the single-phase power supply and the second electrical cable, said central facility including a fourth switch for electrically coupling and decoupling the first and second electrical cables, said wellhead facility including a fifth switch for electrically coupling and decoupling the power equipment and the first electrical cable.

7. The hydrocarbon production system according to claim 6, said first, second, third, fourth, and fifth electrical switches allowing the hydrocarbon production system to alternate between a powering mode of operation where the three-phase power supply powers the powered equipment and a heating mode of operation where the single-phase power supply provides for inductive heating of the pipeline, said first and fifth electrical switches being closed when the system is operated in the powering mode, said first and fifth electrical switches being opened when the system is operated in the heating mode.

8. The hydrocarbon production system according to claim 7, said second and third electrical switches being closed when the system is operated in the heating mode, said second and third electrical switches being opened when the system is operated in the powering mode.

9. The hydrocarbon production system according to claim 6, said three-phase power supply being operable to provide three-phase power of at least about 2,000 volts, said single-phase power supply being operable to provide single-phase alternating current power of less than about 500 volts.

10. The hydrocarbon production system according to claim 6, said first and second electrical cables each including three insulated conductors surrounded by a common protective jacket.

11. A method of retrofitting an existing subsea pipeline with a pipeline heating system, said existing subsea pipeline being operable to transport fluids from a wellhead facility to a central facility, said method comprising the steps of:

(a) positioning a first electrical cable alongside the pipeline, said first electrical cable including a protective jacket surrounding three insulated electrical conductors;

(b) electrically coupling one end of the first electrical cable to a first switching device located at the central facility;

(c) electrically coupling an opposite end of the first electrical cable to a second switching device located at the wellhead facility; and (d) electrically coupling the first switching device to a three-phase power supply and a single-phase power supply located at the central facility so that the first switching device can electrically couple and decouple the first electrical cable to the three-phase and single-phase power supplies.

12. The method according to claim 11; and (e) operating the system in a powering mode by using the first switching device to electrically couple the first electrical cable to the three-phase power supply; and (f) operating the system and an inductive heating mode by using the first switching device to electrically couple the first electrical cable to the single-phase power supply.

13. The method according to claim 11, said first switching device including a first electrical switch for electrically coupling and decoupling the three-phase power supply and the first electrical cable, said first switching device including a second electrical switch for electrically coupling and decoupling the single-phase power supply and the first electrical cable, said second switching device including a third electrical switch for electrically coupling and decoupling the powered equipment and the first electrical cable, said second switching device including a fourth electrical switch for electrically coupling and decoupling the first electrical cable and the ground.

14. The method according to claim 11, and (g) positioning a second electrical cable alongside the pipeline on a side of the pipeline that is generally opposite the side of the pipeline along which the first electrical cable is positioned.

15. The method according to claim 14, and (h) electrically coupling one end of the second electrical cable to the first switching device; and (i) electrically coupling an opposite end of the second electrical cable to the second switching device.

16. The method according to claim 15, said first switching device including a first electrical switch for electrically coupling and decoupling the three-phase power supply and the first electrical cable, said first switching device including a second electrical switch for electrically coupling and decoupling the single-phase power supply and the first electrical cable, said first switching device including a third electrical switch for electrically coupling and decoupling the single-phase power supply and the second electrical cable, said first switching device including a fourth electrical switch for electrically coupling and decoupling the first and second electrical cables, said second switching device including a fifth electrical switch for electrically coupling and decoupling the powered equipment and the first electrical cable.

* * * * *